United States Patent

Martin et al.

(10) Patent No.: US 8,943,306 B2
(45) Date of Patent: Jan. 27, 2015

(54) METHODS, SYSTEMS, AND COMPUTER READABLE MEDIA FOR DESIGNATING A SECURITY LEVEL FOR A COMMUNICATIONS LINK BETWEEN WIRELESS DEVICES

(75) Inventors: Philippe Martin, San Jose, CA (US); Mohammad Khan, San Jose, CA (US); Jean-Christophe Raynon, San Jose, CA (US)

(73) Assignee: Mastercard International Incorporated, Purchase, NY (US)

( * ) Notice: Subject to any disclaimer, the term of this patent is extended or adjusted under 35 U.S.C. 154(b) by 173 days.

(21) Appl. No.: 13/332,247

(22) Filed: Dec. 20, 2011

(65) Prior Publication Data

US 2012/0159149 A1 Jun. 21, 2012

Related U.S. Application Data

(60) Provisional application No. 61/425,079, filed on Dec. 20, 2010.

(51) Int. Cl.
*H04L 29/06* (2006.01)
*H04W 12/06* (2009.01)

(52) U.S. Cl.
CPC .......... *H04L 63/105* (2013.01); *H04L 63/0823* (2013.01); *H04W 12/06* (2013.01)
USPC ............... 713/151; 713/186; 713/172; 726/1; 726/2; 726/30

(58) Field of Classification Search
CPC .. H04L 63/105; H04L 63/0823; H04W 12/06
USPC ...................... 713/151, 186, 172; 726/1, 2, 30
See application file for complete search history.

(56) References Cited

U.S. PATENT DOCUMENTS 7,577,603 B2 * 8/2009 Leroy .............................. 705/37
7,698,230 B1 * 4/2010 Brown et al. ................... 705/75

(Continued)

FOREIGN PATENT DOCUMENTS

WO WO 2009/147548 A2 * 12/2009 .................. 726/2

OTHER PUBLICATIONS

"Information technology—Telecommunications and information exchange between systems—Near Field Communications—Interface and Protocol (NFCIP-1)," ISO/IEC 18092, pp. 1-66 (Apr. 1, 2004).

(Continued)

*Primary Examiner* — Thuong Nguyen
(74) *Attorney, Agent, or Firm* — Jenkins, Wilson, Taylor & Hunt, P.A.

(57) ABSTRACT

A content issuer entity designates a transport security level for each of a plurality of electronic certificates and provides the electronic certificates to a first wireless device. A second wireless device establishes a communications link to transfer electronic certificate data associated with one or more electronic certificates stored on the first wireless device to the second wireless device via a wireless transaction and determines, for each stored electronic certificate, a transport security level previously designated at the content issuer entity. At the first wireless device, a highest transport security level is determined from among the respective transport security levels associated with the stored electronic certificates. The electronic certificate data is transferred from the first wireless device to the second wireless device via the communications link in accordance with a security measure that corresponds to the highest determined transport security level.

25 Claims, 2 Drawing Sheets

(56) References Cited

U.S. PATENT DOCUMENTS

| | | |
|---|---|---|
| 2002/0103881 A1* | 8/2002 | Granade et al. ............... 709/218 |
| 2003/0128099 A1* | 7/2003 | Cockerham ................... 340/5.7 |
| 2003/0208449 A1* | 11/2003 | Diao ............................... 705/67 |
| 2005/0086178 A1* | 4/2005 | Xie et al. ........................ 705/80 |
| 2006/0015562 A1* | 1/2006 | Kilian-Kehr et al. ......... 709/206 |
| 2007/0016795 A1* | 1/2007 | Asano ........................... 713/182 |
| 2008/0086759 A1* | 4/2008 | Colson .............................. 726/2 |
| 2008/0219444 A1* | 9/2008 | Benteo et al. ................. 380/255 |
| 2008/0244695 A1* | 10/2008 | Lee et al. .......................... 726/1 |
| 2008/0288405 A1* | 11/2008 | John ............................... 705/44 |
| 2009/0292930 A1* | 11/2009 | Marano et al. ................ 713/189 |
| 2011/0010761 A1* | 1/2011 | Doyle .............................. 726/5 |
| 2011/0015947 A1* | 1/2011 | Erry et al. ......................... 705/3 |
| 2011/0197074 A1* | 8/2011 | Foley et al. ................... 713/186 |
| 2011/0208594 A1* | 8/2011 | Doro .......................... 705/14.69 |
| 2012/0036071 A1* | 2/2012 | Fulton et al. ................... 705/44 |

OTHER PUBLICATIONS

"Identification cards—Contactless integrated circuit(s) cards—Proximity cards—Part 4: Transmission protocol," ISO/IEC 14443-4, pp. 1-39 (Mar. 10, 2000).

"Identification cards—Contactless integrated circuit(s) cards—Proximity cards—Part 3: Initialization and anticollision," ISO/IEC 14443-3, pp. 1-48 (Jun. 11, 1999).

* cited by examiner

METHODS, SYSTEMS, AND COMPUTER READABLE MEDIA FOR DESIGNATING A SECURITY LEVEL FOR A COMMUNICATIONS LINK BETWEEN WIRELESS DEVICES

PRIORITY CLAIM

The present application claims the benefit of U.S. Provisional Patent Application Ser. No. 61/425,079, filed Dec. 20, 2010, the disclosure of which is incorporated herein by reference in its entirety.

TECHNICAL FIELD

The subject matter described herein relates to wireless devices conducting payment and non-payment transactions. More particularly, the subject matter described herein relates to methods, systems, and computer readable media for designating a security level for a communications link between wireless devices.

BACKGROUND

In nearly all current contactless payment protocols, a security level associated with the wireless transfer of electronic certificates is defined by the communicating wireless devices involved in the contactless payment transaction, i.e., the sending wireless device and the receiving/redeeming wireless device. For example, the security level to be applied to the transfer of an electronic certificate involved in a contactless payment transaction is typically based on a security protocol that is mutually agreed upon by the two negotiating wireless devices. More importantly, the security level designation for the wireless transfer and the associated user experience (i.e., the applied security level affects the speed/rate in which the wireless transaction is completed) is not controlled by the issuer entity responsible for providing the electronic certificate content.

Accordingly, there exists a need for methods, systems, and computer readable media for designating a security level for a communications link between wireless devices.

SUMMARY

According to one aspect, the subject matter described herein includes methods, systems, and computer readable media for designating a security level for a communications link between wireless devices. In one embodiment, the method includes designating, by a content issuer entity, a transport security level for each of a plurality of electronic certificates and providing the plurality of electronic certificates to a first wireless device. The method also includes establishing, at a second wireless device, a communications link to transfer electronic certificate data associated with one or more electronic certificates stored on the first wireless device to the second wireless device via a wireless transaction and determining, for each of the one or more stored electronic certificates, a respective transport security level previously designated at the content issuer entity. The method further includes determining, at the first wireless device, a highest transport security level from among the respective transport security levels associated with the one or more stored electronic certificates and transferring the electronic certificate data associated with the one or more electronic certificates from the first wireless device to the second wireless device via the communications link in accordance with a security measure that corresponds to the determined highest transport security level.

As used herein, the terms "wireless device", "NFC enabled device", and "NFC enabled device" may be synonymous and are intended to refer to any device with near field communication (NFC), RF communication, or barcode capturing capabilities. In near field communication, a wireless device may communicate with a passive wireless transceiver, or smart tag, located on or in the smart poster via inductive coupling of the smart tag antenna to the NFC enabled device antenna. The wireless device may also communicate via NFC with a wireless reader in a similar fashion (i.e., via inductive coupling). The two loop antennas from the two devices effectively form a transformer. The wireless reader or smart tag amplitude-modulates the radio frequency (RF) field to send information to the wireless device. The wireless device communicates with the transceiver and/or reader by modulating the loading on the device antenna, which also modulates the load on the reader antenna. As used herein, the term "wireless communications" includes communications conducted at ISO 14443 and ISO 18092 interfaces. These specifications define communication protocols for wireless smart devices operating in close proximity with a reader antenna.

The subject matter described herein may be implemented in software, in combination with hardware and/or firmware. For example, the subject matter described herein may be implemented in software executed by a hardware processor. In one exemplary implementation, the subject matter described herein for designating a security level for a communications link between wireless devices may be implemented using a non-transitory computer readable medium having stored thereon executable instructions that when executed by the hardware processor of a computer control the computer to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The present subject matter describes various methods, systems, and computer readable media for designating a security level for a communications link between wireless devices. In one embodiment, a content issuer entity (e.g., an issuer server) is configured to assign a transport security level to an electronic certificate that is ultimately provisioned on a wireless device. Subsequent wireless transfer of the electronic certificate between wireless devices is conducted in a manner in accordance with the assigned transport security level included in the electronic certificate. In the event a wireless transaction involves a plurality of electronic certificates, a highest transport security level is determined and the electronic certificate data associated with the plurality of electronic certificates is transferred in accordance to the determined highest transport security level.

In one embodiment, a near field communications (NFC) link may be used to facilitate the transfer of electronic certificate data between two wireless devices. For example, an NFC communications link may be established between two NFC enabled mobile devices, between an NFC enabled mobile device and an NFC enabled reader, between an NFC enabled mobile device and any other NFC enabled consumer electronics device. An exemplary NFC enabled consumer electronics device includes, but is not limited to, an NFC enabled tablet, an NFC enabled wireless device writer, an NFC enabled personal computer, an NFC enabled television, an NFC enabled point of sale device, an NFC enabled personal data assistant, an NFC enabled boarding pass reader, an NFC enabled smart appliance, an NFC enabled check-in reader, an NFC enabled door lock access controller, an NFC enabled transit ticket reader, an NFC enabled transportation ticket reader, and an NFC enabled ticket reader, and the like. Although the following is described in the context of NFC and NFC enabled wireless devices, any other wireless communications protocol (e.g., Bluetooth, WiFi, WiMax, and the like) may be utilized without departing from the scope of the present subject matter.

Figure 1:
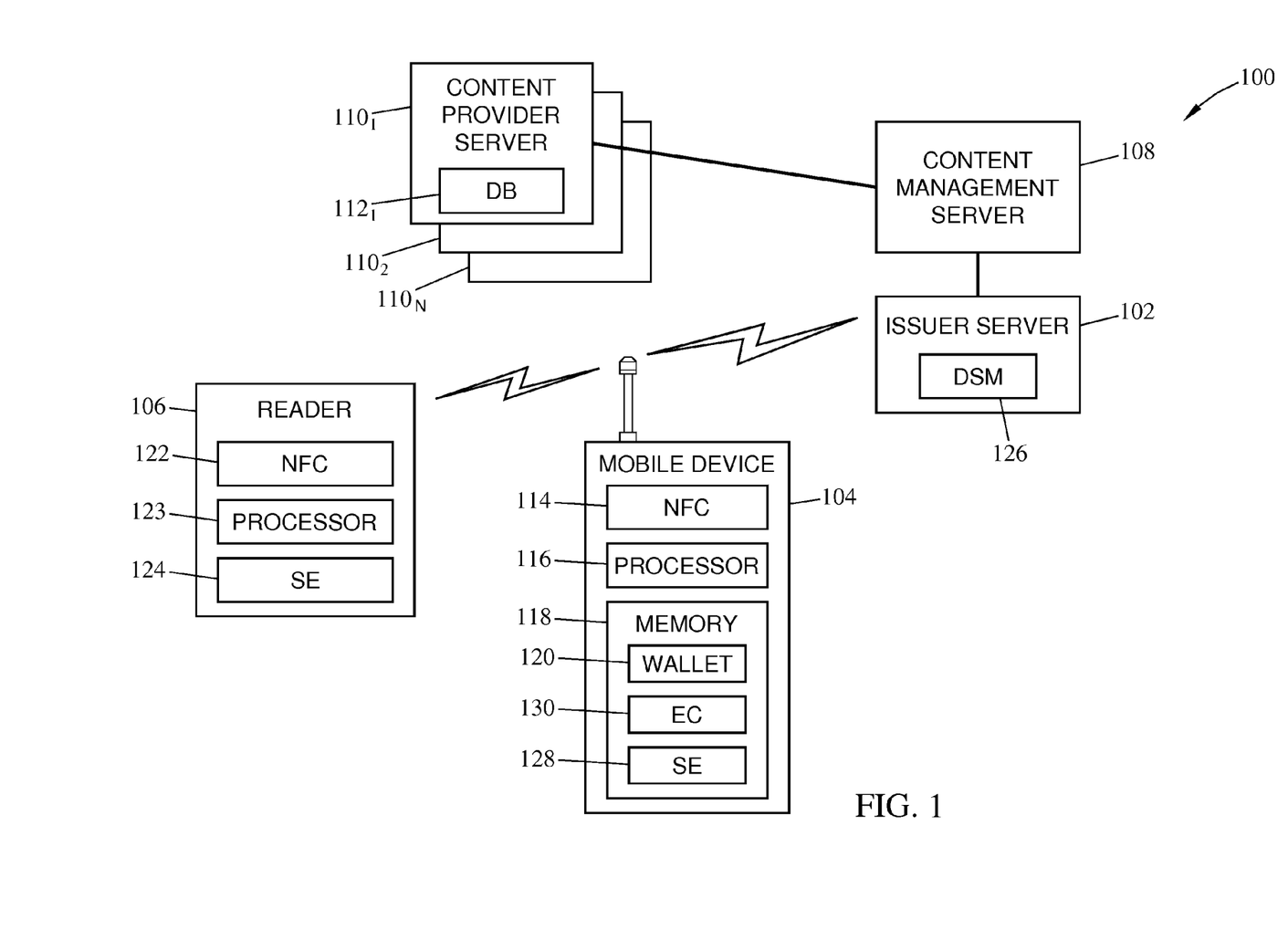
FIG. 1 is a block diagram illustrating an exemplary system for designating a security level for a communications link between wireless devices according to an embodiment of the subject matter described herein.

FIG. 1 is a block diagram depicting an exemplary system 100 for designating a security level for a communications link between NFC enabled wireless devices according to an embodiment described herein. Although the following description describes designating a security level for a communications link between NFC enabled wireless devices, system 100 may also be applied to other types of wireless device wireless devices (e.g., Bluetooth devices, WiFi devices, WiMax devices, etc.) without departing from the scope of the present subject matter. Referring to FIG. 1, exemplary system 100 includes a wireless device 102 (e.g., an NFC enabled mobile device), a wireless reader 106, a content issuer entity (e.g., an issuer server 102), a content management server (CMS) 108, and a plurality of content provider servers (CPS) $110_{1 \ldots n}$.

In one embodiment, a mobile wireless device user may use NFC enabled wireless device 104 to request one or more electronic certificates from a backend server associated with a merchant or non-merchant entity. As used herein, an electronic certificate may refer to an electronic based softcard or data entity that is electronically provisioned on wireless device 104. Exemplary electronic certificates include, but are not limited to, gift cards, electronic loyalty cards, electronic prepaid cards, electronic coupons, electronic tickets, electronic boarding passes, electronic transit cards, electronic credit cards, electronic debit cards, electronic payment cards, electronic vouchers, electronic membership cards, electronic health insurance cards, electronic promotions, electronic offers, electronic rewards, electronic incentives, electronic health information, electronic citations, electronic product information, electronic service information, electronic appointments, electronic business cards, and electronic contact information, electronic access passes, and the like.

In one embodiment, wireless device 104 may be configured to request an electronic certificate from CMS 108 (either directly or via a trigger management server configured to receive and route requests). In one embodiment, wireless device 104 may send the electronic certificate request to CMS 108 by obtaining the CMS address information from a smart poster, a bar code, a quick response (QR) code, or the like. In one embodiment, wireless device 104 may include a hardware based NFC module 114 that is configured to facilitate and conduct NFC communications with other NFC enabled devices such as a smart poster or wireless reader 106. In one embodiment, NFC module 114 may be embodied either as a hardware based radio chipset or a software based module executed by a hardware processor 116 that is coupled to the antenna(s) of wireless device 104. Wireless device 104 may also be provisioned with a camera (not shown) which may be used to scan and read QR codes containing information regarding CMS 108.

Once the address information (e.g., a uniform resource locator (URL), internet protocol (IP) address, or tag identification number associated with CMS 108) is obtained, wireless device 104 may wirelessly send the electronic certificate identifier (e.g., also obtained from a smart tag in a smart poster or incorporated in the QR code) to CMS 108.

In one embodiment, a wallet application 120 in wireless device 104 is configured to contact CMS 108 using the address information by sending an electronic certificate request message. The request message may include one or more of: the CMS address, an electronic certificate identifier, and a subscriber identifier (e.g., the phone number of wireless device 104). In one embodiment, wallet application 120 may reside in a memory element 118 of wireless device 104. Wallet application 120 may also be stored in a secure memory element 128 of NFC enabled device 104 or in a non-secure baseband memory without departing from the scope of the present subject matter.

In one embodiment, wireless device 104 includes a wallet application 120. In one embodiment, wallet application 120 may include a software application or module (e.g., a MIDlet application) that is stored in memory 118 (either in a secure memory element and/or non-secure baseband memory) of wireless device 104, and when executed by a hardware based processor in wireless device 104 is capable of performing various functionalities. For example, wallet application 120 may utilize and manage multiple electronic certificates and softcards stored on wireless device 104, such as electronic credit cards, electronic debit cards, electronic loyalty cards, electronic loyalty reward certificates, electronic coupons, electronic tickets, and the like. Wallet application 120 may also be used to communicate information to CMS 108 and receive provisioned data from an OTA provisioning server, such as issuer server 102. Payment credentials, such as electronic payment softcards including credit or debit cards may also be stored in any suitable user defined priority within wallet application 120.

Upon receiving the request message, CMS 108 may be configured to locate electronic certificate data using the electronic certificate identifier. In one embodiment, the electronic certificate data may be stored locally in a database or memory. Alternatively, the electronic certificate data may be stored externally to the CMS 108, such as in CPS 110 or in some other remote database or storage server. In such a scenario, CMS 108 may use a content provider identifier to determine the address or location of CPS 110. For example, CMS 108 may use the electronic certificate identifier to access a database that maps electronic certificate identifiers to address information associated with content provider servers $110_{1 \ldots n}$. In one embodiment, CMS 108 may then use the mapped CPS address information to locate the CPS 110 containing the requested electronic certificate data. Alternatively, the CPS address information may be provided by original smart poster or QR code.

After identifying the appropriate content provider server that contains the electronic certificate data, CMS 108 may send a request message to CPS 110. In response, CPS 110 may retrieve the requested electronic certificate data from a local database 112 and subsequently forward the retrieve electronic certificate data to CMS 108. CMS 108 may be configured to then forward the electronic certificate data to wireless device 104 via an over the air (OTA) provisioning server, such as issuer server 102. In an alternate embodiment, CPS 110 may be configured to forward the electronic certificate data directly to issuer server 102 instead of through CMS 108. In another embodiment, a content In one embodiment, issuer server 102 may be configured to receive electronic certificate data and the subscriber identifier from CMS 108. Using the subscriber identifier associated with wireless device 104, issuer server 102 may send electronic certificate content over the air to wireless device 104. In one embodiment, issuer server 102 establishes a secure communication link with wallet application 120.

In one embodiment, issuer server 102 may be configured to define the transport security level of electronic certificate data. As used herein, transport security level refers to the security level that is applied to the communications link that facilitates the electronic transfer of data between two wireless devices (e.g., NFC enabled mobile device and an NFC enabled reader). For example, issuer server 102 defines a transport security level in a metadata field in the associated electronic certificate. In one embodiment, the electronic certificate may include a plurality of fields within the metadata field, such as an issuer ID field, transport security level field, unique ID field, an icon/image data field, and a description field.

In one embodiment, a content issuer entity, such as issuer server 102, maintains a database that maps transport security level indicators with various security measures or protocols. Although FIG. 1 depicts content issuer entity as issuer server 102, any other network server or device that enables a content provider entity to issue electronic certificates to wireless devices may be used without departing from the scope of the present subject matter. Exemplary security measures/protocols may include, but are not limited to, a mutual authentication security measure, a no replay/reuse security measure, a message authentication code (MAC) security measure, an encryption security measure, a checksum security measure, a hashing security measure, a cyclic redundancy check (CRC) security measure, and a clear data measure (i.e., no security measure is utilized). Notably, a content issuer entity (e.g., issuer server 102) may designate one or more of the security measures associated with a given security level that is to be applied to the subsequent wireless transfers of electronic certificate data between wireless devices. In one embodiment, issuer server 102 is provisioned with a decision selection module (DSM) 126. DSM 126 may be programmed with software algorithm that, when executed by a hardware processor (not shown), inspects a given electronic certificate and subsequently assigns/writes a transport security level indicator or value in the electronic certificate data based on the inspection prior to delivery to wireless device 104. For example, DSM 126 may determine the monetary value associated with a given electronic certificate that is to be provisioned on wireless device 104. DSM 126 may then access a local database that maps transport security levels with varying monetary value ranges. For example, a value range of $100-$500 may be mapped to three or more transport security measures, while a monetary value range of $1-$10 may only be mapped to one transport security measure. Similarly, the database may indicate that no security measures are need for electronic certificates containing a monetary value ranging one to five cents.

In another embodiment, DSM 126 may also determine the confidentiality or sensitivity level associated with a given electronic certificate that is to be provisioned on wireless device 104. For example, DSM 126 may access a local database that maps transport security levels with varying information confidentiality levels. For example, highly confidential information (e.g., a bank account number) may be mapped to three or more transport security measures, while low confidential information (e.g., a membership number) may only be mapped to one transport security measure. Similarly, the database may indicate that no security measures are needed for electronic certificates containing non-confidential information (e.g., promotions or advertisements). In an alternate embodiment, DSM 126 may be utilized by a network operator to assign transport security levels at the discretion of the network operator.

After determining the transport security level to be assigned to an electronic certificate, DSM 126 may insert or write the determined transport security level into the electronic certificate content itself. In one embodiment, the transport security level indicator inserted into the metadata field may be protected by any encryption mechanism in order to prevent any fraudulent tampering. Similarly, issuer server 102 may utilize a checksum or authorization code mechanism to secure the assigned transport security level indicator. Issuer server 102 may then wirelessly send the electronic certificate content with transport security level (as determined by the issuer server 102) to wireless device 104. In one embodiment, the transport security level may be represented by an alphanumeric identifier, a flag, or other indicator.

Once received from issuer server 102, the electronic certificate data may be stored as an electronic certificate 130 in wireless device 104. In one embodiment, electronic certificates may be stored in baseband memory 118 or in a secure element 128 of wireless device 104. In one embodiment, secure element 128 may reside in the processor, in the memory, or in an add-on device in wireless device 104. Exemplary secure elements include an embedded secure element integrated chipset, a SIM card, a microSD card, and a trust zone. After receiving the electronic certificate data, wireless device 104 may be configured to graphically display the electronic certificates to a user via a screen display.

After being stored on wireless device 104, one or more electronic certificates may be selected for wireless transfer to a second wireless device, such as NFC enabled wireless reader 106. For example, the selected electronic certificates may be electronic coupons that the user wants to redeem at wireless reader 106 (e.g., at a point of sale reader). In one embodiment, wireless reader 106 may include a hardware based NFC module 122 that is configured to facilitate and conduct NFC communications with other NFC enabled devices, such as NFC enabled wireless device 104. In one embodiment, NFC module 122 may be embodied either as a hardware based radio chipset or a software based module executed by a hardware processor 123 that is coupled to the antenna(s) of wireless reader 106.

In one embodiment, NFC enabled wireless reader 106 establish a wireless transaction communications link with wireless device 104, such as when wireless reader 106 initiates a handshaking negotiation procedure when wireless device 104 is brought into close proximity to or tapped with wireless reader 106. Communication between the two NFC enabled devices may be initiated, for example, when the antenna of wireless device 104 is brought within an electromagnetic field generated by wireless reader 106.

After the handshaking procedure is complete, a communications session/link between wireless device 104 and wireless reader 106 is established. A user of wireless device 104 may then select one or more electronic certificates to be applied to a wireless transaction (e.g., a payment transaction or non-payment transaction) with reader 106. However, prior to the transfer of any electronic certificate data from wireless device 104 to wireless reader 106, wallet application 120 determines the highest transport security level required by each of the one or more selected electronic certificates. In one embodiment, wallet application 120 is configured to access and read a transport security level data field (e.g., in a metadata field of the electronic certificate data) in each of the one or more electronic certificates. Wallet application 120 may then determine which one of the plurality of transport security levels associated with the selected electronic certificates is the highest transport security level based on the indicators found in the transport security level data field of the electronic certificate(s). Although FIG. 1 depicts a wallet application 120, any other software application module (when executed by processor 116) configured to access and read electronic certificate data fields may be used without departing from the scope of the present subject matter.

If only one electronic certificate is to be transferred to reader 106 in the wireless transaction, then wallet application 120 accesses and reads the transport security level value contained in that particular electronic certificate. However, if more than one electronic certificate is to be transferred in the wireless transaction, then wallet application 120 is configured to access and read the transport security level value contained in each of the selected electronic certificates. Wallet application 120 then processes all of the transport security level values and determines the transport security level value that indicates the highest level of security (e.g., the highest transport security level value). In one embodiment, the highest level of security may include the greatest number of transport security measures indicated in a single electronic certificate. In an alternate embodiment, the highest level of security may include the highest "grade" or "level" indicated among all of the electronic certificates to be transferred. For example, issuer server 102 may use an alphanumeric designation system to define varying transport security levels. In one embodiment, issuer server 102 may be configured to assign one of seven transport security levels to a given electronic certificate. Although only seven security levels are described below, additional (or less) transport security levels may be utilized without departing from the scope of the present subject matter. In this particular embodiment, the transport security levels are predefined such that security levels decrease in relation to increasing wireless transfer rates. For example, the exemplary list below begins with the highest transport security level (e.g., transport security level 1) and ends with the lowest security level (e.g., transport security level 7). In one embodiment, the seven transport security levels and their corresponding security measures/protocols (to be applied to electronic certificate data transferred between wireless devices) may include:

1) Encrypted data+MAC
2) Encrypted data+Hash
3) Encrypted data+CRC
4) Data in clear+MAC
5) Data in clear+Hash
6) Data in clear+CRC
7) Data in clear Thus, DSM 126 in issuer server 102 may insert a transport security level value (i.e., level 1 to level 7) in a metadata field in the electronic certificate. Notably, the security level value may be accessed and read by wallet application 120 after the electronic certificate data is provisioned on wireless device 104 and is selected for wireless transfer. For example, wallet application 120 may read the metadata fields in each electronic certificate to determine the transport security level associated with each electronic certificate that has been designated for wireless transfer to wireless reader 106. Wallet application 120 then determines which one of the transport security levels is the highest transport security level. Wallet application 120 may then be configured to wirelessly send all of the designated electronic certificates to wireless reader 106 in accordance with the highest transport security level. For example, a first electronic certificate (e.g., an electronic $100 gift card) may include a transport security level of 2 (high) in its metadata field and a second electronic certificate (e.g., a 50 cent electronic coupon) may include a transport security level of 6 (low) in its metadata field. In one embodiment, both electronic certificates have been designated to be transferred via an NFC link from the wireless device 104 to wireless reader 106 as part of a contactless payment transaction. Wallet application 120 in wireless device 104 accesses the metadata fields for each electronic certificate and determines that security level 2 is the highest transport security level between the two electronic certificates. Accordingly, wireless device 104 informs wireless reader 106 that electronic certificate data associated with both the first and second electronic certificates is to be transferred to reader 106 via security level 2.

After wallet application 120 determines the highest transport security level, wireless device 104 may then instruct wireless reader 106 that the wireless transaction of electronic certificate data (e.g., monetary value data, account numbers, membership numbers, subscriber numbers, card numbers, magnetic stripe equivalent information, and the like) associated with the one or more electronic certificates will be wirelessly transferred over the established communications link in accordance with the determined highest transport security level in a single tap. For example, the electronic certificate data associated with the plurality of the electronic certificates is transferred in a single payload and/or transaction to reader 106. If wireless reader 106 does not support the determined highest transport security level, then wireless device 104 terminates the communications link with reader 106. If wireless reader 106 does support the determined highest transport security level, then wireless device 104 wirelessly transfers the electronic certificates to wireless reader 106 via the communications link in accordance with a security measure(s) that corresponds to the highest transport security level in a single tap. In one embodiment, the electronic certificates may be transferred over an NFC communications link either via a peer to peer (P2P) mode in accordance with ISO 18092 or a card emulation mode in accordance to ISO 14443. Notably, if the peer to peer mode is utilized, a secure element in wireless device 104 (i.e., the sending wireless device) is not required.

In an alternate embodiment, electronic certificate data may be transferred to a wireless device 104 from wireless reader 106. Notably, wireless reader 106 may also be configured with data writing capabilities. For example, wireless reader 106 may wished to provide one or more electronic certificates to wireless device 104. For example, there may be an instance where a merchant entity wishes to transfer a new loyalty card to wireless device 104, upgrade an existing loyalty card on the wireless device 104, add monetary value to an electronic gift card residing in wireless device 104, and/or provide electronic coupons to wireless device 104. In this scenario, issuer server 102 may be part of a point of sale (POS) system associated with the merchant entity. As described above, issuer server 102 may utilize a database to determine an appropriate transport security level in which the transfer of electronic loyalty card data, coupon, or gift card data to a wireless device 104. Issuer server 102 communicates the appropriate security level to wireless reader 106 by inserting a transport security level indictor in the electronic certificate content. In one embodiment electronic certificate content may be stored in a local database or in a secure element 124. Wireless reader 106 may then establish a communication link with wireless device 104 and determine the highest transport security level by inspecting the one or more electronic certificates to be transferred to wireless device 104. Afterwards, wireless reader may transfer all of the selected/designated electronic certificates in accordance with the determined highest transport security level.

Figure 2:
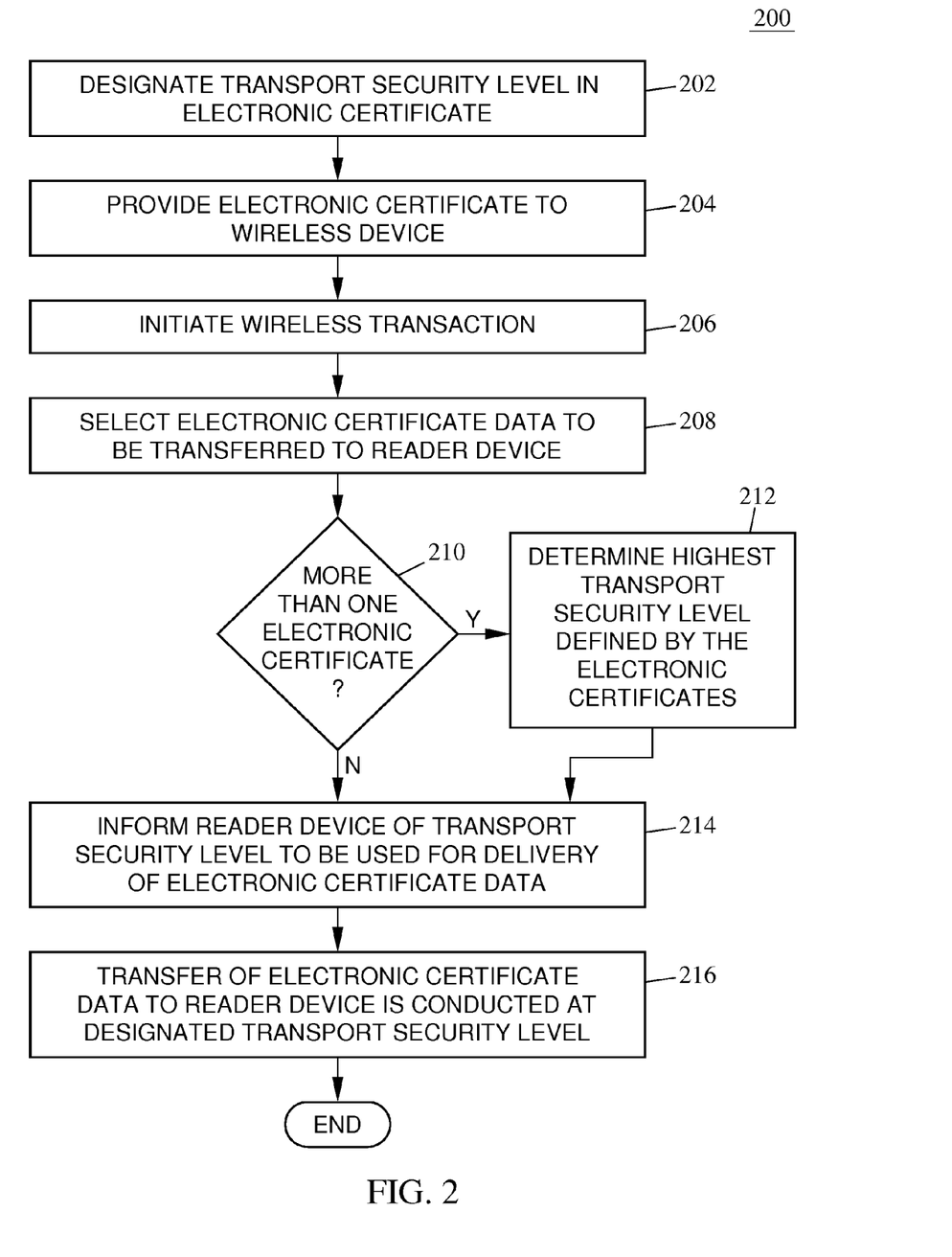
FIG. 2 is a flow chart illustrating an exemplary process for designating a security level for a communications link between wireless devices according to an embodiment of the subject matter described herein.

FIG. 2 is a flow chart illustrating an exemplary process 200 for designating a transport security level for a wireless link between wireless devices according to an embodiment of the subject matter described herein. In block 202, a transport security level in an electronic certificate is defined. In one embodiment, an issuer server 102 designates a security level for an electronic certificate that is being provisioned onto mobile device 104.

In block 204, the electronic certificate is provided to a first wireless device. In one embodiment, issuer server 102 sends one or more electronic certificates to be provisioned on NFC enabled mobile device 104.

In block 206, a transaction with a second wireless device is initiated. In one embodiment, NFC enabled mobile device 104 taps or is place in close proximity to NFC enabled reader 106. In response, NFC enabled reader 106 initiates a handshaking procedure in which a communications link is established.

In block 208, one or more electronic certificates are selected for transfer to the second wireless device. In one embodiment, a user selects one or more electronic certificates 130 stored on wireless device 104 for transfer to reader 106. For example, the selected electronic certificates may be designated for a contactless payment (or non-payment) transaction.

In block 210, a determination is made as to whether one or more electronic certificates are being transferred to the second wireless device (e.g., a wireless reader). If only one electronic certificate is selected then method 200 proceeds to block 214. If more than one electronic certificate has been selected, then method 200 continues to block 212. In one embodiment, wallet application 120 makes the determination in block 210.

In block 212, a highest transport security level as defined by the selected electronic certificates is determined. In one embodiment, wallet application 120 inspects the metadata field in each electronic certificate designated for wireless transfer to reader 106. Specifically, the metadata field is accessed in order to read the transport security level indicator/value previously assigned by issuer server 102. Wallet application 120 may then process all of the transport security level indicators in order to determine a highest transport security level.

In block 214, the second wireless device is informed by the first wireless device of the transport security level to be used for delivery of the one or more electronic certificates. If one electronic certificate was selected, then the transport security level associated with that electronic certificate is used. If more than one electronic certificate were selected in block 208, then the highest transport security level (as determined in block 212) is used.

In block 216, electronic certificate data associated with the one or more electronic certificates are wireless delivered to second wireless device in accordance with a security measure or protocol that corresponds to the designated highest transport security level.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for designating a transport security level for a communications link between wireless devices, the method comprising:
designating, by a content issuer server, a wireless transport security level for each of a plurality of electronic certificates, wherein the wireless transport security level is defined in a metadata field in each of the plurality of electronic certificates;
sending, by the content issuer server, the plurality of electronic certificates to a first wireless device, wherein each of the plurality of electronic certificates includes an electronic based softcard associated with a monetary value;
establishing, at a second wireless device, a wireless communications link to transfer electronic certificate data associated with one or more electronic certificates stored on the first wireless device to the second wireless device via a wireless transaction, wherein the stored electronic certificates includes at least the plurality of electronic certificates from the content issuer server;
determining, for each of the one or more stored electronic certificates, a respective wireless transport security level previously designated at the content issuer server;
determining, at the first wireless device, a highest wireless transport security level from among the respective wireless transport security levels associated with the one or more stored electronic certificates; and
transferring the electronic certificate data associated with the one or more electronic certificates from the first wireless device to the second wireless device via the wireless communications link in accordance with a security measure that corresponds to the determined highest wireless transport security level.

2. The method of claim 1 wherein the wireless communications link includes at least one of: a near field communications (NFC) communications link, a Bluetooth communications link, a WiFi communications link, and a WiMax communications link.

3. The method of claim 1 wherein the first wireless device and the second wireless device each includes at least one of an NFC enabled device, a Bluetooth enabled device, and a WiFi enabled device.

4. The method of claim 3 wherein the NFC enabled device includes at least one of: an NFC enabled mobile device, an NFC enabled wireless reader, an NFC enabled tablet, an NFC enabled wireless device writer, an NFC enabled personal computer, an NFC enabled television, an NFC enabled point of sale device, an NFC enabled personal data assistant, an NFC enabled boarding pass reader, an NFC enabled smart appliance, an NFC enabled check-in reader, an NFC enabled door lock access controller, an NFC enabled transit ticket reader, an NFC enabled transportation ticket reader, and an NFC enabled ticket reader.

5. The method of claim 1 wherein the one or more electronic certificates include one or more electronic gift cards, electronic loyalty cards, electronic prepaid cards, electronic coupons, electronic tickets, electronic boarding passes, electronic transit cards, electronic credit cards, electronic debit cards, electronic payment cards, electronic vouchers, electronic membership cards, electronic health insurance cards, electronic promotions, electronic offers, electronic rewards, electronic incentives, electronic health information, electronic citations, electronic product information, electronic service information, electronic appointments, electronic business cards, electronic access passes, and electronic contact information.

6. The method of claim 1 wherein the wireless transport security level is designated as an alphanumeric value in a wireless transport security level subfield in the metadata field included in each of the plurality of electronic certificates.

7. The method of claim 1 wherein designating the transport security level includes:
   determining, at the issuer server, a monetary value for each of the plurality of electronic certificates to be sent to the first wireless device;
   accessing a database that maps the wireless transport security levels with monetary values; and
   for each of the plurality of electronic certificates, inserting into the metadata field the wireless transport security level that is mapped to the determined monetary value associated with the electronic certificate.

8. The method of claim 1 wherein the security protocol includes at least one of: a mutual authentication security protocol, a single usage security protocol, an encryption security protocol, a checksum security protocol, a hashing security protocol, and clear data protocol.

9. The method of claim 1 wherein the wireless transaction may be conducted either via a card emulation mode or a peer to peer (P2P) mode.

10. The method of claim 1 wherein the first wireless device utilizes a secure element to conduct the wireless transaction.

11. The method of claim 10 wherein the secure element resides in at least one of: a processor within the first wireless device, memory within the first wireless device, or as an add-on device included within the first wireless device.

12. The method of claim 11 wherein the secure element includes at least one of: an embedded secure element integrated chipset, a SIM card, a microSD card, and a trust zone.

13. A system for designating transport security level between two near field communications (NFC) devices, the system comprising:
   a content issuer server configured for defining wireless transport security levels for a plurality of electronic certificates and transmitting the plurality of electronic certificates, wherein each of the wireless transport security levels is defined in a metadata field in each of the plurality of electronic certificates, wherein each of the plurality of electronic certificates includes an electronic based softcard associated with a monetary value; and
   a first wireless device configured for receiving the plurality of electronic certificates from the content issuer server, for conducting a wireless transaction to transfer electronic certificate data associated with one or more electronic certificates stored within the first wireless device, for determining a respective wireless transport security level previously designated at the content issuer server for each of the one or more stored electronic certificates, and for determining a highest transport security level from among the respective wireless transport security levels associated with the stored electronic certificates, wherein the stored electronic certificates includes at least the plurality of electronic certificates from the content issuer server; and
   a second wireless device configured for establishing a wireless communications link associated with the wireless transaction to receive the electronic certificate data associated with one or more electronic certificates stored on the first wireless device and for receiving the electronic certificate data associated with the one or more electronic certificates from the first wireless device in accordance with a security measure that corresponds to the determined highest wireless transport security level.

14. The system of claim 13 wherein the wireless transaction includes at least one of: a near field communications (NFC) transaction, a Bluetooth transaction, a WiFi transaction, and a WiMax transaction.

15. The system of claim 13 wherein the first wireless device and the second wireless device each includes at least one of an NFC enabled device, a Bluetooth enabled device, and a WiFi enabled device.

16. The system of claim 15 wherein the NFC enabled device includes at least one of: an NFC enabled mobile device, an NFC enabled wireless reader, an NFC enabled tablet, an NFC enabled wireless device writer, an NFC enabled personal computer, an NFC enabled television, an NFC enabled point of sale device, an NFC enabled personal data assistant, an NFC enabled boarding pass reader, an NFC enabled smart appliance, an NFC enabled check-in reader, an NFC enabled door lock access controller, an NFC enabled transit ticket reader, an NFC enabled transportation ticket reader, and an NFC enabled ticket reader.

17. The system of claim 13 wherein the one or more electronic certificates include one or more electronic gift cards, electronic loyalty cards, electronic prepaid cards, electronic coupons, electronic tickets, electronic boarding passes, electronic transit cards, electronic credit cards, electronic debit cards, electronic payment cards, electronic vouchers, electronic membership cards, electronic health insurance cards, electronic promotions, electronic offers, electronic rewards, electronic incentives, electronic health information, electronic citations, electronic product information, electronic service information, electronic appointments, electronic business cards, electronic access passes, and electronic contact information.

18. The system of claim 13 wherein the wireless transport security level is designated as an alphanumeric value in a transport security level subfield in the metadata field included in each of the plurality of electronic certificates.

19. The system of claim 13 wherein the issuer server is further configured for determining, at the issuer server, a monetary value for each of the plurality of electronic certificates to be sent to the first wireless device, for accessing a database that maps the wireless transport security levels with monetary values, and for each of the plurality of electronic certificates, inserting into the metadata field the wireless transport security level that is mapped to the determined monetary value associated with the electronic certificate.

20. The system of claim 13 wherein the security protocol includes at least one of: a mutual authentication security protocol, a single usage security protocol, an encryption security protocol, a checksum security protocol, a hashing security protocol, and clear data protocol.

21. The system of claim 13 wherein the wireless transaction may be conducted either via a card emulation mode or a peer to peer (P2P) mode.

22. The system of claim 13 wherein the first wireless device utilizes a secure element to conduct the wireless transaction.

23. The system of claim 22 wherein the secure element resides in at least one of: a processor within the first wireless device, memory within the first wireless device, or as an add-on device included within the first wireless device.

24. The system of claim 23 wherein the secure element includes at least one of: an embedded secure element integrated chipset, a SIM card, a microSD card, and a trust zone.

25. A non-transitory computer readable medium having stored thereon computer executable instructions that when executed by a processor of a computer controls the computer to perform steps comprising:

designating, by a content issuer server, a wireless transport security level for each of a plurality of electronic certificates, wherein the wireless transport security level is defined in a metadata field in each of the plurality of electronic certificates;

sending, by the content issuer server, the plurality of electronic certificates to a first wireless device, wherein each of the plurality of electronic certificates includes an electronic based softcard associated with a monetary value;

establishing, at a second wireless device, a wireless communications link to transfer electronic certificate data associated with one or more electronic certificates stored on the first wireless device to the second wireless device via a wireless transaction, wherein the stored electronic certificates includes at least the plurality of electronic certificates from the content issuer server;

determining, for each of the one or more stored electronic certificates, a respective wireless transport security level previously designated at the content issuer server;

determining, at the first wireless device, a highest wireless transport security level from among the respective wireless transport security levels associated with the one or more stored electronic certificates; and     transferring the electronic certificate data associated with the one or more electronic certificates from the first wireless device to the second wireless device via the wireless communications link in accordance with a security measure that corresponds to the determined highest wireless transport security level.

\* \* \* \* \*